(12) United States Patent
Kuan et al.

(10) Patent No.: US 10,674,736 B1
(45) Date of Patent: Jun. 9, 2020

(54) METHOD OF MAKING A MEAT PRODUCT AND A MEAT PRODUCT

(71) Applicant: TYSON FOODS, INC., Springdale, AR (US)

(72) Inventors: Naikang Kuan, Wheaton, IL (US); Paul Thomas Connor, LeMars, IA (US)

(73) Assignee: Tyson Foods, Inc., Springdale, AR (US)

( * ) Notice: Subject to any disclaimer, the term of this patent is extended or adjusted under 35 U.S.C. 154(b) by 218 days.

(21) Appl. No.: 15/932,295

(22) Filed: Feb. 16, 2018

Related U.S. Application Data

(60) Provisional application No. 62/459,728, filed on Feb. 16, 2017, provisional application No. 62/568,688, filed on Oct. 5, 2017.

(51) Int. Cl.
*A22C 7/00* (2006.01)
*A22C 17/00* (2006.01)
*A23L 13/40* (2016.01)

(52) U.S. Cl.
CPC .......... *A22C 7/0007* (2013.01); *A22C 7/0023* (2013.01); *A22C 17/002* (2013.01); *A23L 13/48* (2016.08); *A23V 2002/00* (2013.01)

(58) Field of Classification Search
CPC ......... A22C 7/00; A22C 7/007; A22C 7/0023; A22C 25/00; A22C 25/18; A01J 1/00
USPC ................ 452/135, 149, 156, 157, 171, 174
See application file for complete search history.

(56) References Cited

U.S. PATENT DOCUMENTS

| | | | | |
|---|---|---|---|---|
| 4,628,569 A | * | 12/1986 | Gagliardi, Jr. | ........ A22B 5/0029 452/135 |
| 5,525,103 A | * | 6/1996 | White | ................. A22B 5/0029 452/135 |
| 7,666,075 B1 | | 2/2010 | Baker et al. | |
| 7,959,500 B1 | | 6/2011 | Baker et al. | |
| 8,727,840 B2 | | 5/2014 | Connor et al. | |
| 10,182,579 B1 | * | 1/2019 | Kuan | ................... A22C 17/002 |
| 2004/0265454 A1 | * | 12/2004 | Smith | ................ A22C 17/0006 426/513 |

(Continued)

FOREIGN PATENT DOCUMENTS

CA    2033789 A1    7/1991

*Primary Examiner* — Richard T Price, Jr.
(74) *Attorney, Agent, or Firm* — McAfee & Taft, A Professional Corporation

(57) ABSTRACT

The present disclosure describes new meat products and new processing and cutting techniques that more effectively utilize an animal carcass. A boneless rib-meat product and method of producing the same are disclosed. The boneless meat product includes two boneless rib-meat portions, each boneless rib-meat portion has an interior side. The interior side includes alternating raised surfaces and depressions. The two boneless rib-meat portions are positioned together in a stacked configuration with the interior side of each boneless rib-meat portion oriented toward and in contact with the other. The raised surfaces of each boneless rib-meat portion are offset with each other such that the raised surfaces of each boneless rib-meat portion are positioned within a corresponding depression of the other boneless rib-meat portion. The stacked boneless rib-meat portions are secured together via cooking to cause the boneless rib-meat portions to bind together.

12 Claims, 6 Drawing Sheets

(56) References Cited

U.S. PATENT DOCUMENTS

| | | | |
|---|---|---|---|
| 2005/0089622 A1* | 4/2005 | Bhatnagar | A23L 13/426 |
| | | | 426/646 |
| 2005/0136818 A1* | 6/2005 | Naehring | A22C 7/00 |
| | | | 452/156 |
| 2006/0183416 A1* | 8/2006 | Gagliardi, Jr. | A22C 21/0023 |
| | | | 452/149 |
| 2006/0240756 A1* | 10/2006 | Lobel | A22C 17/0006 |
| | | | 452/151 |
| 2007/0042095 A1* | 2/2007 | Gagliardi, Jr. | A22C 17/0006 |
| | | | 426/332 |
| 2010/0304652 A1* | 12/2010 | Bolte | A22C 17/0046 |
| | | | 452/157 |
| 2016/0037788 A1 | 2/2016 | Corbin et al. | |

* cited by examiner

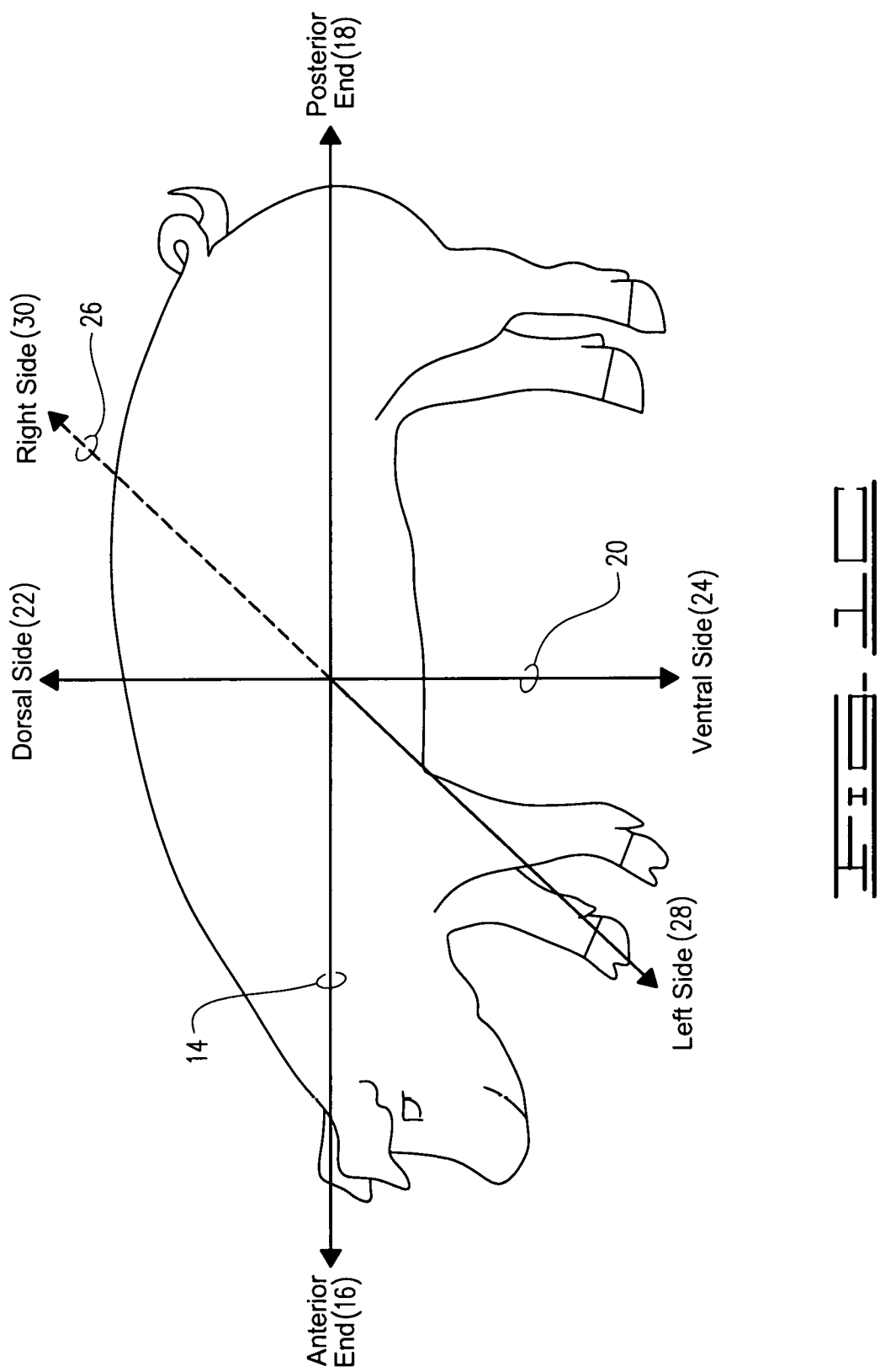

US 10,674,736 B1

METHOD OF MAKING A MEAT PRODUCT AND A MEAT PRODUCT

CROSS-REFERENCE TO RELATED APPLICATION

This application claims priority from U.S. Provisional Patent Application Ser. No. 62/459,728, filed Feb. 16, 2017, and U.S. Provisional Patent Application Ser. No. 62/568,688, filed Oct. 5, 2017, the entire contents of which are each incorporated herein by reference.

BACKGROUND

The meat-producing industry is seeing heavier carcasses than before. As a result of the heavier carcasses, the meat-producing industry, i.e. fabricators, experiences increased costs associated with the processing of the increased-size carcass and the manufacturing of meat products therefrom, including increased labor, shipping, and handling.

For example, with increasing live swine weights, the meat-producing industry is seeing heavier swine carcasses. In the past, the average live weight was approximately 250-270 pounds, now at time of slaughter, swine weigh about 285-300 pounds on average. Increased swine weight directly correlates to an increase in the primal and sub-primal size.

Consumers are generally not interested in buying larger portion sizes, nor are consumers interested in consuming unrecognizable meat products. Efforts to maintain recognizable meat products for consumers and portion sizes that consumers are willing to buy cause the fabricators to not utilize the carcass as fully and cost-effectively, e.g. discarding of portions of meat for use in the lesser-valued trim in order to fabricate the more traditional products and experience more decreasing drop credits values. Fabricators also experience increased costs associated with the manufacture of certain labor-intensive meat products and must find ways to offset the higher-cost manufacture of certain meat products.

SUMMARY

The present disclosure describes new meat products and new processing and cutting techniques that more effectively utilize the animal carcass to make new economical, appetizing, and aesthetically pleasing products available to the consuming public in an industry where there has been a scantiness of any new methods, innovations, and products. The new meat products, new processing and cutting techniques and the meat products produced therefrom allow fabricators to more effectively utilize the carcass, control costs associated with manufacture and fabrication of the carcass, and provide new and innovative meat products that can be offered economically and efficiently, including increasing throughput and/or providing the ability to effectively store more meat products within the same space than compared to current traditional meat products. The new meat products, new processing and cutting techniques and the meat products produced therefrom also allow the fabricators to receive economic benefits by increasing the drop credit value, use the previously-discarded meat portions for new products that can be valued up, and maintain the ability to use other portions of the carcass to fabricate other meat products, including current "traditional" meat products.

A method of making a boneless rib-meat product from two boneless rib-meat portions is disclosed. Each of the boneless rib-meat portions has an interior side and a lateral side. The interior side includes alternating raised surfaces and depressions. The method comprises the steps of: positioning the boneless rib-meat portions in a stacked configuration with the interior side of each boneless rib-meat portion oriented toward and touching each other. The raised surfaces of each boneless rib-meat portion are offset with each other such that the raised surfaces of each boneless rib-meat portion are positioned within a corresponding depression of the other boneless rib-meat portion. The method further includes the step of securing the stacked boneless rib-meat portions via cooking to cause the boneless rib-meat portions to bind together.

A product produced by the method of making a boneless rib-meat product of paragraph 6 is disclosed.

A boneless rib-meat product comprising two boneless rib-meat portions, each boneless rib-meat portion has an interior side and a lateral side. The interior side includes alternating raised surfaces and depressions. The two boneless rib-meat portions are positioned together in a stacked configuration with the interior side of each boneless rib-meat portion oriented toward and in contact with each other. The raised surfaces of each boneless rib-meat portion are offset with each other such that the raised surfaces of each boneless rib-meat portion are positioned within a corresponding depression of the other boneless rib-meat portion.

BRIEF DESCRIPTION OF THE DRAWINGS

FIG. 1C illustrates general points of reference pertaining to anatomical axes for quadrupeds.

DETAILED DESCRIPTION

Figure 1A:
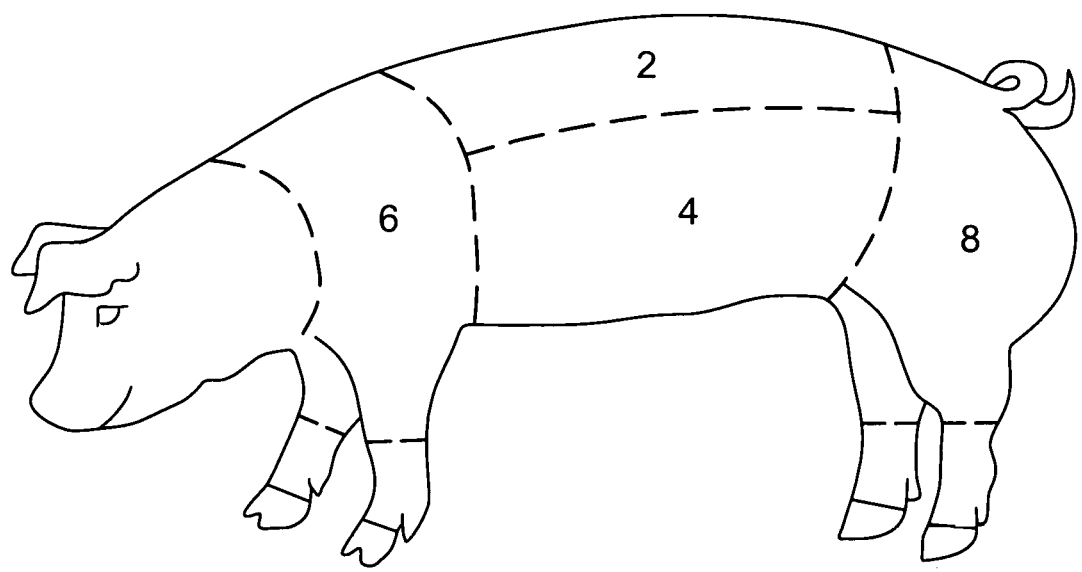
FIG. 1A illustrates primal cuts of a pig.

As used herein, the terms "pig," "swine," "hog," and the like are used interchangeably and refer any animal of the Suidae family commonly used in association with the production and consumption of its meat, i.e. pork. Nothing herein shall limit this disclosure to the domestic pig or any other domesticated animal for which the described processing and cutting techniques may be used. For ease of readability, the present disclosure is made in reference to pigs; however, the disclosed processing and cutting techniques and resulting meat products are also applicable to other animals, including, without limitation, cattle, lamb, and deer, and the applicable animal's associated primal and sub-primal cuts.

As used herein, the phrase "substantially intact" when used in reference to a muscle group includes any associated fat, within a particular portion of interest, e.g., primal, sub-primal, carcass cut. The substantially intact muscle group has approximately 50% or above of the initial muscle and fat material present in that portion of the applicable primal or sub-primal. The substantially intact muscle and fat is not based on a percentage of the total muscle material for the particular muscle present in the entire carcass (if such muscle is found in other primal or sub-primal cuts).

As used herein, the phrase "consisting essentially of" used in connection with a specific muscle or group of muscles refers to the muscle plus the seams associated with muscle(s) and possibly also minor proportions, approximately less than or equal to 10% of other muscles and carcass materials. Carcass materials include all materials, fluids, and bone fragments of the carcass. As used herein, "undesirable components" includes any material or component that may affect the aesthetic and/or appetizing appearance of the meat product to consumers and may adversely affect a pleasant culinary experience by the consumer. Examples of undesirable components may include material such as excess fat, blood clots, bruises, bone chips, cartilage, intermuscular seams, and/or extraneous material present on the meat due to the cutting process, such as, but not limited to, bone fragments that fall on the meat during deboning. As used herein, "associated seams" includes membranes and/or connective tissue, including intermuscular seams. As used herein, the term "consumers" includes all levels of consumers of the meat product, including wholesale consumers, food-industry consumers, retail consumers, and any consumer of any of the foregoing, and individuals that consume the meat product.

The terms of approximation, including, "generally," "substantially," "about," "approximately," and the like, and each of their respective variants and derivatives will be understood to allow for minor variations and/or deviations that do not result in a significant impact thereto. Such terms of approximation should be interpreted according to their ordinary and customary meanings as used in the associated art unless indicated otherwise. Absent a specific definition and absent ordinary and customary usage in the associated art, such terms should be interpreted to be ±10% of the base value. The use of ordinal number terminology (i.e., "first," "second," "third," "fourth," etc.) is for the purpose of differentiating between two or more items and is not meant to imply any sequence or order or importance to one item over another or any order of addition. The term "or combinations thereof" as used herein refers to all permutations and combinations of the listed items preceding the term. The skilled artisan will understand that typically there is no limit on the number of items or terms in any combination, unless otherwise apparent from the context.

As will be used herein, directional terms, such as "above," "below," "upper," "lower," "top," etc. and/or terms as they pertain to the carcass, including "medial," "lateral," "cavity-side," "skin-side," "bone-side," and "meat-side" illustrate general points of reference pertaining to quadrupeds and/or anatomical axes for quadrupeds and are used for convenience in referring to the accompanying drawings and descriptions thereof and are not intended to limit the scope of the appended claims. For example, with reference to ribs of a carcass, the "cavity-side," "membrane-side," or "bone-side" refer to the portion of the ribs that is medial or closer to the median plane or located along or toward the middle or interior of the carcass; and "meat-side," "lean-side," or "lateral side" refer to the outer portion of the ribs that have more meat thereon and are closer to the lateral side or skin-side or exterior of the carcass and away from the median plane of the carcass.

For illustrative purposes of the present disclosure, the figures depict the disclosed methods, processing steps, and techniques, and the resulting products as performed manually. Such illustration shall not be construed to be limited to being performed manually or solely by hand or other manual techniques. The disclosed methods, processing steps, and techniques may be done manually, automatically, semi-automatically, or combinations of any of the foregoing. The present disclosure includes references to cutting, dividing, and separating steps; such steps are achieved by any method known in the art. Non-limiting examples of cutting, dividing, and separating devices include: automated, manual, or mechanized cutting devices, such as, but not limited to, a knife or knives; rotary knives; saws of all types, including pneumatic saws, hand saws, and band saws; shears; multi-blade cutting systems; fluid jets; pullers; and any combination of one or more of each of any of the foregoing.

Figure 1B:
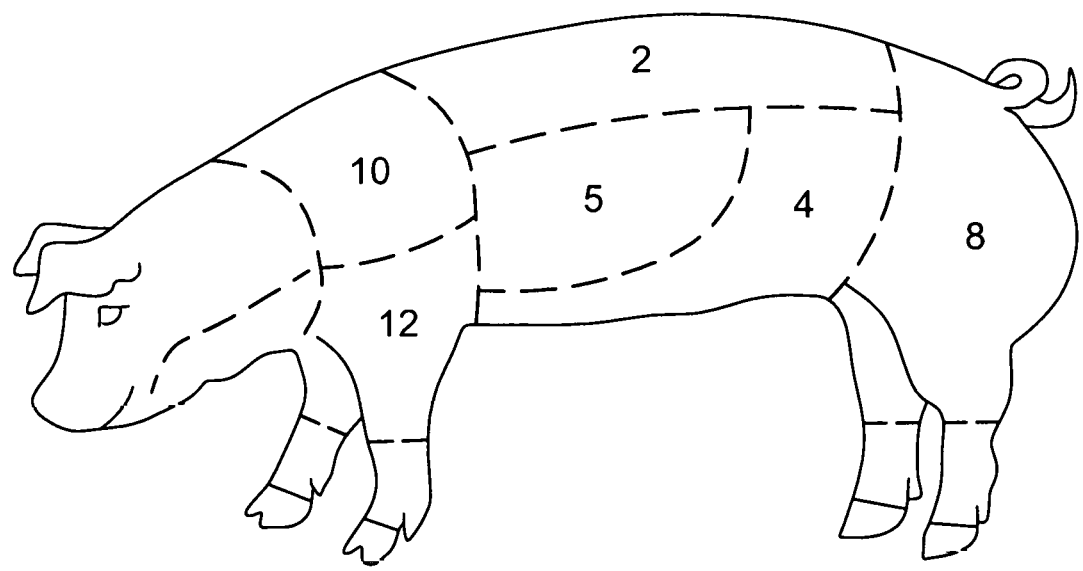
FIG. 1B illustrates some sub-primal cuts of a pig.

FIG. 1A depicts four primal cuts of a pig, the loin 2, belly 4, shoulder 6, and leg or ham 8. FIG. 1B illustrates some sub-primal cuts of a pig, the loin 2, belly 4, sparerib 5, leg or ham 8, blade or Boston butt 10 of shoulder 6, picnic shoulder 12.

FIG. 1C illustrates some general points of reference pertaining to anatomical axes for quadrupeds. For example, the anterior-posterior axis 14 with the anterior end 16 and posterior end 18 labeled in the direction shown. The dorsal-ventral axis 20 with the dorsal side 22 and ventral side 24 labeled in the direction shown. The left-right axis 26 with the left side 28 and right side 30 labeled in the direction shown.

Figure 2:
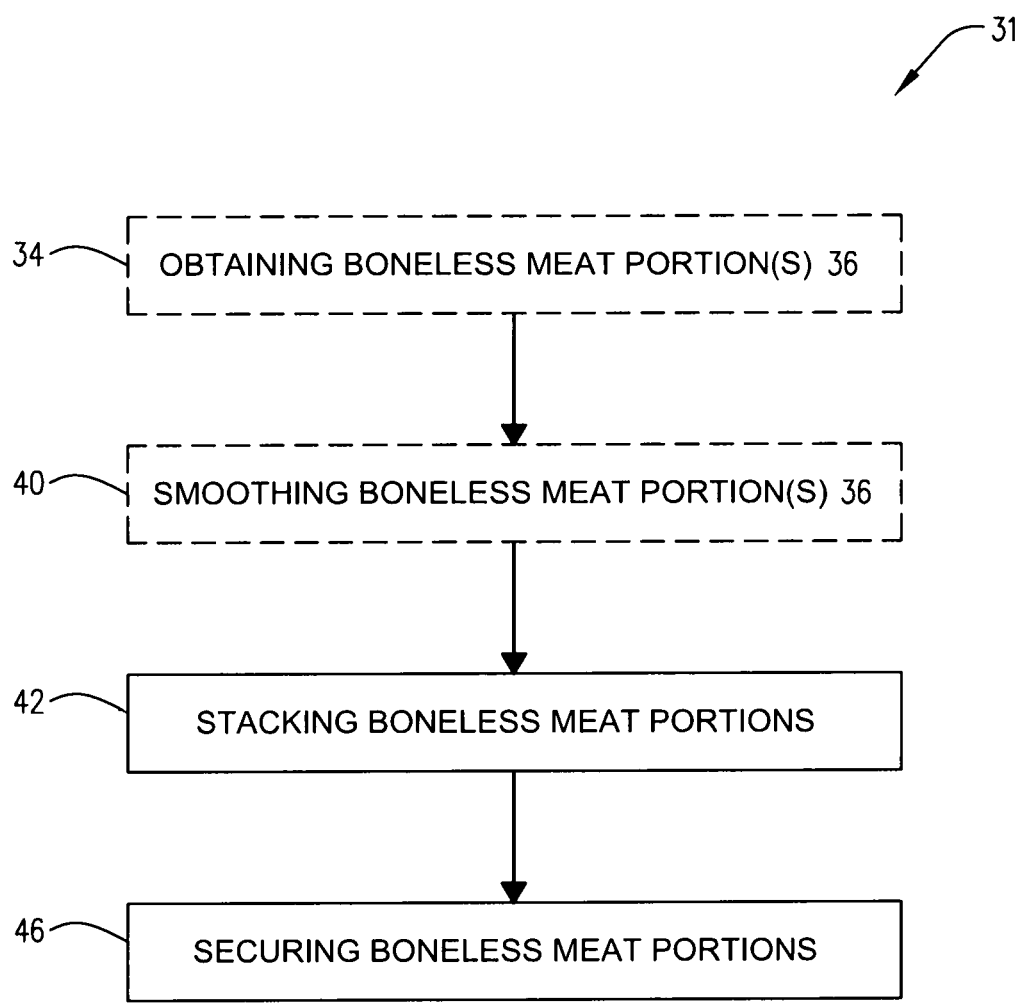
FIG. 2 is an example flow chart for a method of forming a boneless meat product.
Figure 3A:
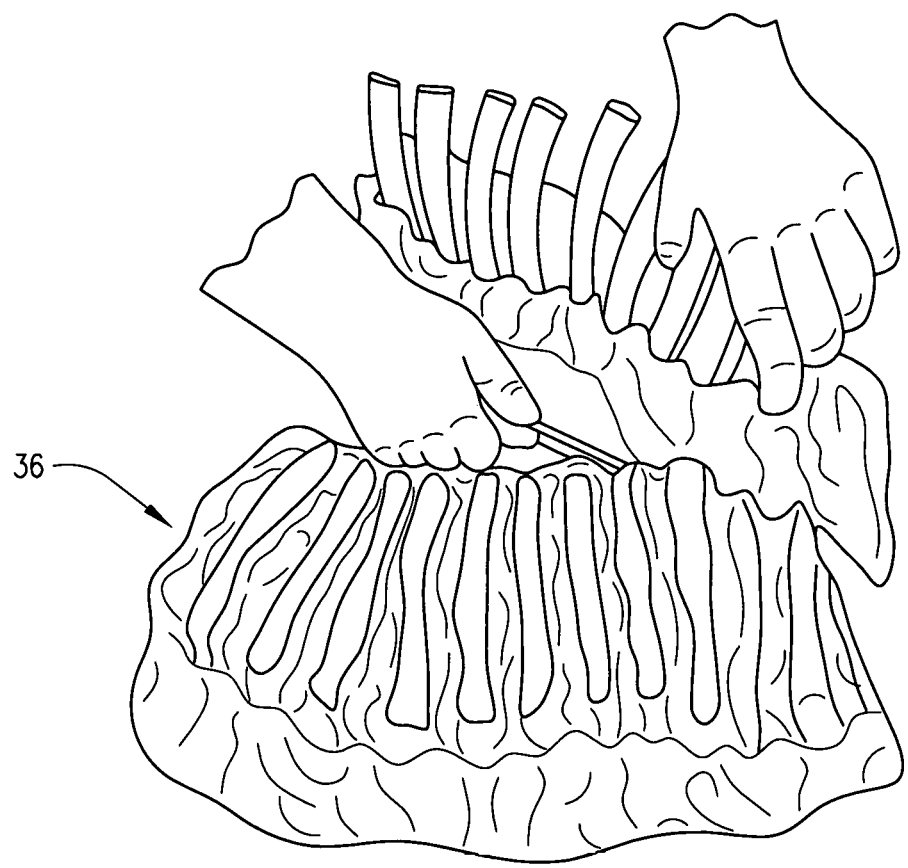
FIGS. 3A-3C are example visual illustrations of a method of processing a carcass as applied to a pork carcass.
Figure 3B:
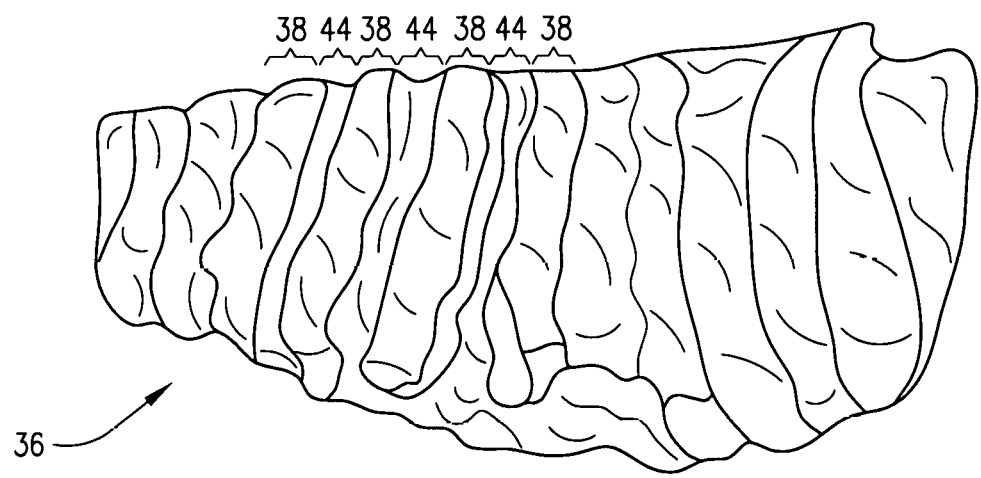
Figure 3C:
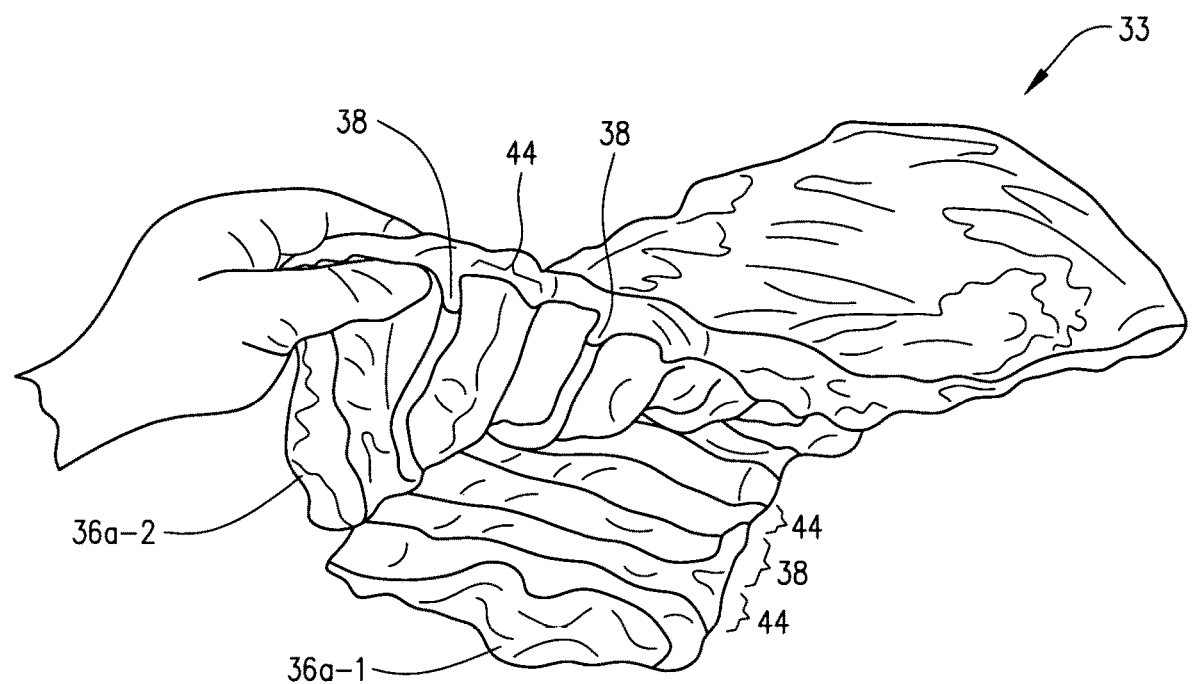

FIG. 2 is an example flow chart for a method 31 of forming a boneless meat product 33. The boneless meat product 33 is a rib-meat product and is formed with two boneless meat portions 36. FIGS. 3A-3C are example visual illustrations of method 31 of processing a carcass as applied to a pork carcass.

Figure 4:
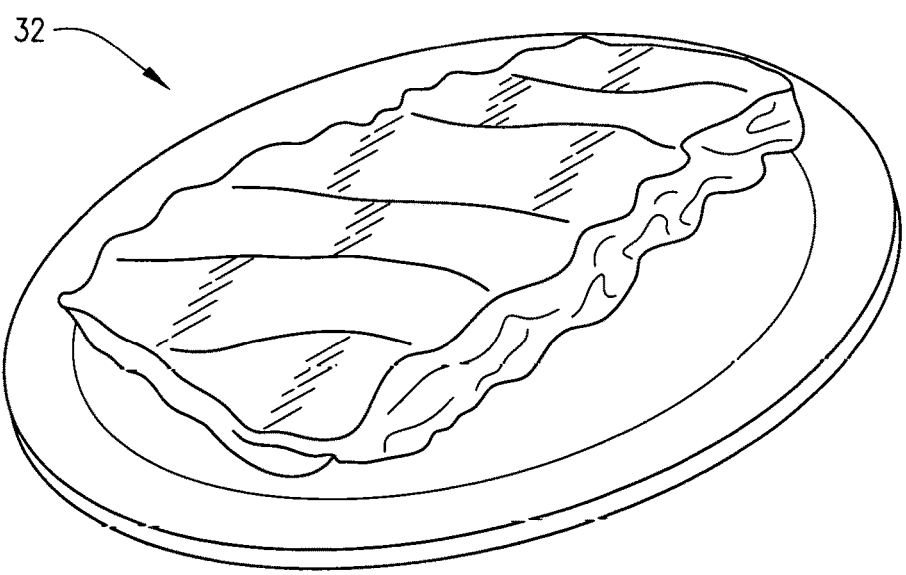
FIG. 4 depicts an illustration of a boneless rib-meat product produced by the method as applied to a pork carcass, as a cooked product.

FIG. 4 depicts an illustration of a boneless rib-meat product 33 produced by method 31 as applied to a pork carcass, as a cooked product 32.

Figure 5:
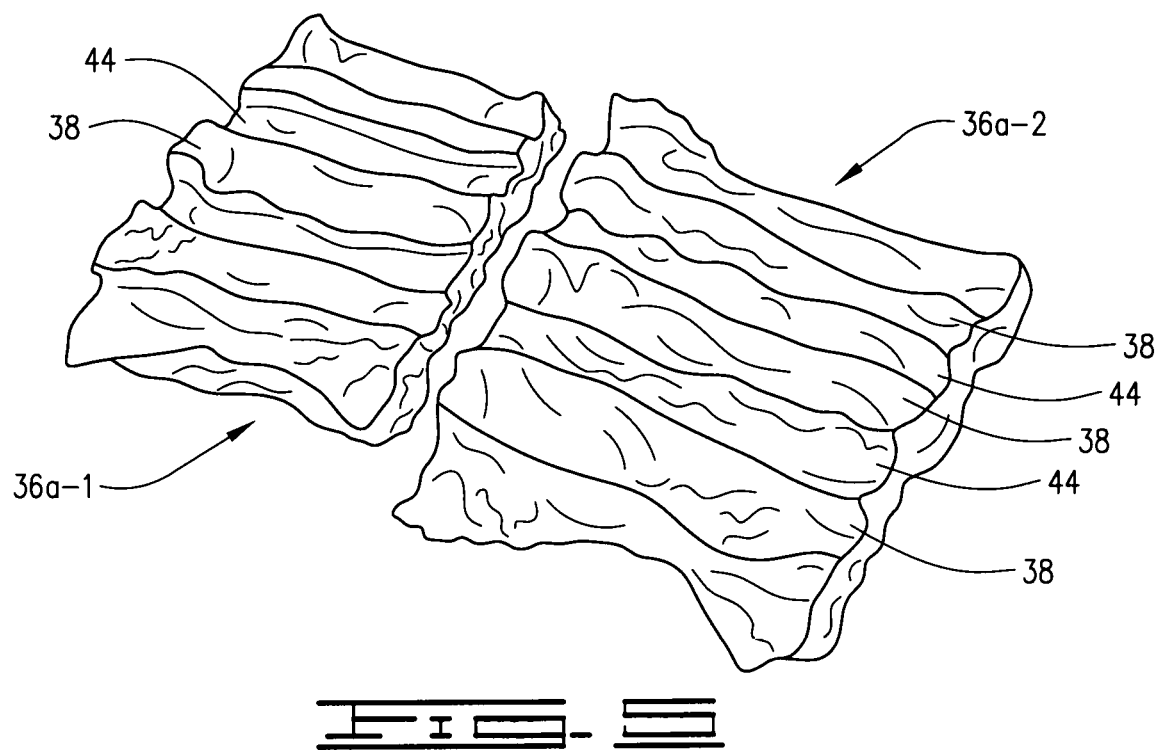
FIG. 5 depicts an illustration of one portion of a method of processing a carcass as applied to a beef carcass.

FIG. 5 depicts an illustration of one portion of method 31 of processing a carcass as applied to a beef carcass.

Figure 6:
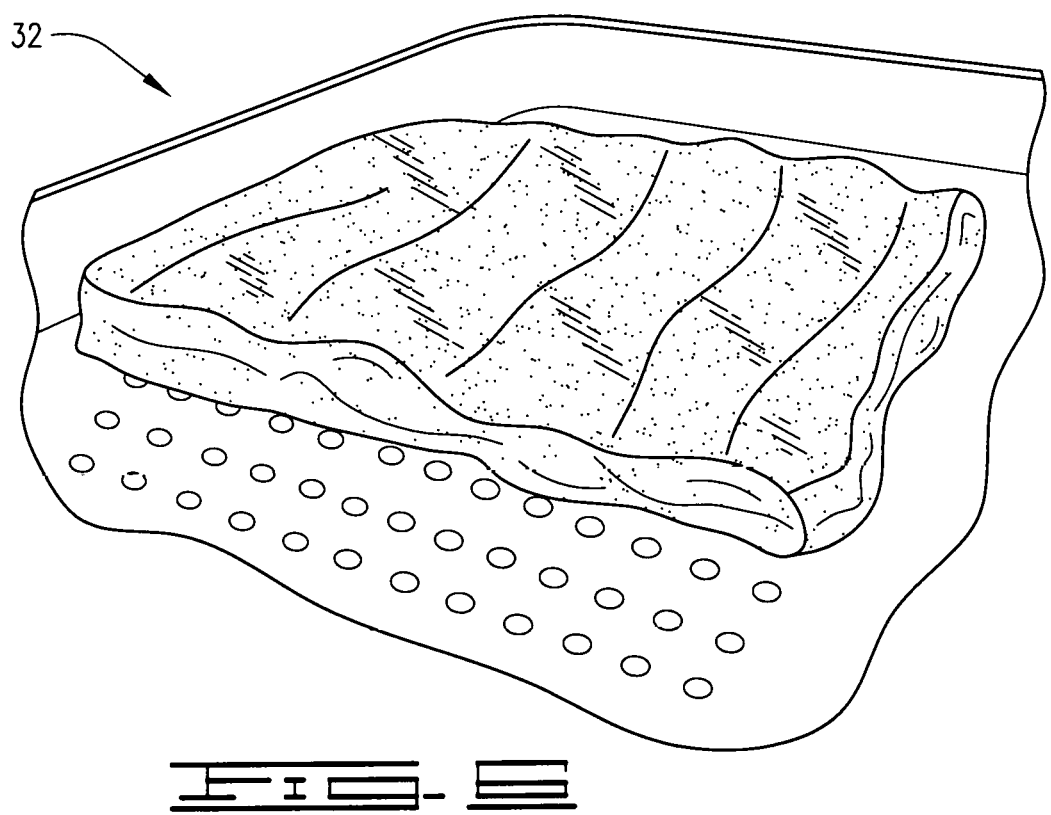
FIG. 6 depicts an illustration of a boneless rib-meat product in a cooked state produced by the method as applied to a beef carcass.

FIG. 6 depicts an illustration of a boneless rib-meat product 33 in a cooked state 32 produced by method 31 as applied to a beef carcass.

With reference to FIGS. 2-4, method 31 can be applied to two boneless sparerib sub-primals and/or applied to another portion of the carcass that is obtained during the manufacture and processing of other meat products from a carcass. For example, method 31 may also begin with two boneless export belly portions that are obtained during other processing of the carcass.

For example, when separating the export belly from the belly, the separation is done in a manner to avoid damaging the belly and keeping the belly substantially intact so that it may be in a suitable and useable condition in connection with the fabrication of fresh belly designated for bacon production. For example, when separating the export belly from the belly, the separated export belly may include the intercostales muscles and a portion of the obliquus abdominis muscles and the belly will include the remaining portion of the obliquus abdominis muscles, and substantially intact cutaneous trunci muscle, and tensor fasciae latae muscle.

The muscles of the boneless sparerib and belly may include the latissimus dorsi, pectorales profundi, cutaneous trunci, rectus abdominis, obliquus internus abdominis, obliquus externus abdominis, serratus ventralis, serratus dorsalis cranialis, tranversus abdominis, tranversus thoracis, intercostales externi, intercostales interni. In some manufacturing processes, removal of bones from a raw (uncooked) carcass is generally labor intensive and may be cost-prohibitive depending on the manufacturing process. Generally for boneless products, the removal of bones typically occurs after a cooking step due to the cost and labor associated with removal of bones from a raw carcass.

The export belly may also be used in connection with the presently described method is a boneless sparerib sub-primal that may be slightly thinner in thickness compared to the boneless sparerib sub-primal meat product obtained during typical processing and fabrication of boneless sparerib sub-primal pieces. For example, one way of obtaining the boneless meat portions 36 which serve as starting material for method 31 may be done via the production of the single rib belly. Such optional step is depicted as reference numeral 34 in FIG. 2.

FIG. 3A is a visual illustration of step 34 and depicts obtaining a boneless belly that is smaller in size than a traditional belly from a carcass. For example, the smaller belly is dimensionally narrower in width or shorter in length compared to the traditional scribed cut belly fabrication. For example, the smaller belly may be about 1 to 2 inches narrower than the traditional scribed cut belly fabrication. As shown in the figures, the narrower belly has raised surfaces 38 that are comprised of intercostal meat (or may be referred to as intercostal fingers) that present in the form of ridges.

Method 31 may proceed to step 40 which includes trimming the raised surfaces 38 to remove intercostal meat material to substantially smooth such surfaces. The trimming of raised surfaces 38 need not result in an even or level surface, but is to avoid wide variances amongst the heights of raised surfaces 38. Further, the trimming of raised surfaces 38 need not be so substantial to make raised surfaces 38 and depressions 44 substantially even. The removal and smoothing of the intercostal fingers may be done by filleting the ridges or any other removal technique known in the art.

FIG. 3B depicts the interior side (or cavity-side) 36a of a boneless meat portion 36, which depicts raised surfaces 38 and depressions 44 in an alternating configuration. Raised surfaces 38 include intercostal muscle and depressions 44 define an area where a rib bone was located.

Method 31 proceeds with step 42 of positioning the two boneless meat portions 36 of similar size and shape, e.g., having approximately the same length and width, together in a stacked configuration to form a boneless meat product 33. FIG. 3C visually depicts the raw boneless meat product 33, which is a stacked configuration of two boneless meat portions 36 with their respective interior sides 36a in an offset configuration with each other (as described below). The boneless meat portions 36 are positioned with respect to each other having their interior side 36a-1 and 36a-2 oriented toward and touching each other.

For example, in the case of a pork carcass, the two boneless meat portions 36 may each be approximately 0.375 inches to approximately 0.5 inches thick. The boneless meat portions 36 are arranged with respect to each other by placing the protruding raised surfaces 38 of each portion in an offset manner such that a raised surface 38 is opposite a depression 44 in the other boneless meat portion 36. Depression 44 is a rib void or area defined by a vacated or removed rib bone. This offset positioning arrangement of the boneless meat portions 36 together allows for a higher protein bonding surface area and provides for the removal of any voids as vacated by the rib bone to create a visually appealing slab of boneless sparerib with no visible membrane-side or interior side 36a.

Optionally (and not depicted), prior to placing the two boneless meat portions 36 together, the two boneless meat portions 36 can be tumbled to extract protein for better adhesion. In addition, prior to placing the two boneless meat portions 36 together, one or both interior sides 36a-1, 36a-2 of boneless meat portions 36 may be seasoned or injected.

With reference to FIG. 2, method 31 includes a securing step 46. Securing step 46 includes cooking the stacked boneless meat portions (e.g. boneless meat product 33) sous vide to secure the stacked boneless meat portions 36 together and form a single piece or product. Securing of the stacked boneless meat portions of the presently described method 31 may also be referred to as "laminating" or "zippering." The stacked boneless meat portions may laminate naturally and without the use of transglutaminase, e.g. meat glue, or any other foreign additive to promote the binding of the two boneless meat portions 36 together during the securing step 46, provided that salt may be placed on the boneless meat portions 36. Optionally, the use of transglutaminase or other additive to promote binding may also be used. The boneless meat portions 36 can be bonded tightly by simple protein extraction using physical maceration.

Securing step 46 may be in the form of a long-slow cook, for example in a water bath at low temperature, such as 140 degrees Fahrenheit (140° F.), or in a high humidity oven at a temperature of about 250° F. to 300° F. The length of time for securing step 46 will be until the meat product 33 is cooked and reaches an internal temperature in the range of about 120° F. to about 160° F. For example, when the cooking environment is at a lower temperature, more time is needed for the internal meat temperature to reach the range of about 120° F. to about 160° F.

The securing or binding of the boneless meat portions 36 is achieved as a result of a protein denaturing process. The boneless meat portions 36 are placed into airtight packaging or vacuum sealed bag and cooked.

Optionally, during the securing step the boneless meat portions 36 remain in the bag to provide the surface pressure and drive out any voids between the boneless meat portions 36. Binding occurs as a result of the myosin protein inherent in all muscle fibers being extracted either through the salt contained in the seasoning mix or through physical extraction method such as vacuum tumbling. The extracted myosin for a matrix is irreversibly denatured during a cooking process when the meat reaches an internal temperature 160° F. and where the coagulated matrix acts as a binder between the meat. For example, protein denaturing generally starts where the meat has an internal temperature of around 120° F., albumin protein starts to set at about 144° F., and collagen and connective tissues generally denature around 158° F.

Following the securing step 42, the cooked boneless rib-meat product 32 may undergo further processing (not depicted). For example, the cooked boneless rib-meat product 32 may be pressed to achieve a target thickness and to cool until the internal meat temperature falls below 40° F. Pressure may be applied via any method known in the art, including manual, automated, or combinations thereof, to achieve a target thickness and/or to drive out any voids produced during the securing step 42. For example, in the case of a pork carcass, the target thickness may be approximately 1.5 inches to approximately 2.5 inches depending on the final application requirement of the cooked boneless rib-meat product 32.

FIG. 5 depicts the equivalent rib portion of boneless meat as applied to a beef carcass of the single boneless portion depicted in FIG. 3B. FIG. 5 also depicts the illustration of the interior sides 36a-1 and 36a-2 of boneless meat portions 36 showing the alternating arranging of raised surfaces 38 and depressions 44 of each boneless meat portion 36. Method 31 as applied to a beef carcass may include obtaining boneless rib portions 36 from the rib tail found on ribs 9-12 and is removed from the 6-12 rib plate, also described as the last 3-4 ribs closest to the sirloin end, and most ventral part of the beef carcass closest to the belly. The method as described in connection with the pork carcass is applied to the boneless beef portion. Securing step 46 for a beef carcass requires a longer and slower cook time compared to that of a pork carcass. For example, the securing step for a beef carcass may be done via a wet cooking cycle or sous vide at 325° F. for about 2-3 hours until internal meat temperature reaches about 160° F. Following securing step 46, method 31 may further include applying pressure to the cooked product 32 to achieve a final thickness and/or to drive out any voids produced during the cooking process of securing step 46. For example, in the case of a beef carcass, the target thickness may be approximately 1 inch to approximately 4 inches depending on the final application requirement of the cooked boneless product 32.

FIG. 6 depicts an illustration of a cooked boneless rib-meat product 32 produced by the method 31 as applied to a beef carcass. Applying the presently described method in a beef carcass may be used as an alternative for fabricating a higher-valued boneless rib-meat product than using the rib-meat as trim in connection with the fabrication of pastrami.

Regardless of whether the type of carcass method 31 is applied, the cooked boneless rib-meat product 32 produced by the described method 31 can then be frozen to preserve the product 32. Product 32 may be provided to consumers who may optionally add additional seasoning and sauces prior to reheating, grilling, and/or searing, and ultimate consumption.

The disclosed method 31 is capable of producing a boneless rib-meat product that can be valued up beyond its alternative trim value. The described method 31 may also be used in connection with other animal carcasses, for example, including but not limited to, beef, lamb, bison, venison, goat, ostrich, alligator, llama, kangaroo, etc.

The new processing and cutting techniques of the described methods herein and the associated meat product and/or meat products produced by the applicable method allow fabricators to more effectively utilize animal carcasses.

Although certain steps are described herein and illustrated in the figures as occurring sequentially, some steps may occur simultaneously with each other or in an order that is not depicted. The present disclosure of the disclosed methods, techniques, functions, and products produced therefrom are not to be limited to the precise descriptions and illustrations. Other embodiments will be apparent to one skilled in the art. As such, the foregoing description merely enables and describes the general products, methods, and uses disclosed herein. While certain embodiments have been described for the purpose of this disclosure, those skilled in the art can make changes without departing from the spirit and scope thereof. Thus, the appended claims define what is claimed.

What is claimed is:

1. A method of making a boneless rib-meat product from two boneless rib-meat portions, each of the boneless rib-meat portions has an interior side and a lateral side, wherein the interior side includes alternating raised surfaces and depressions, the method comprising the steps of:
    positioning the boneless rib-meat portions in a stacked configuration with the interior side of each boneless rib-meat portion oriented toward and touching each other and wherein the raised surfaces of each boneless rib-meat portion are offset with each other such that the raised surfaces of each boneless rib-meat portion are positioned within a corresponding depression of the other boneless rib-meat portion; and
    cooking the stacked boneless rib-meat portions to cause the boneless rib-meat portions to bind together.

2. The method of claim 1, further comprising the step of:
    prior to the positioning step, trimming the raised surfaces of the boneless rib-meat portion to provide a substantially smooth raised surface.

3. The method of claim 1, further comprising the step of:
    after the cooking step, pressing the bound stacked boneless rib-meat portions to achieve a target thickness.

4. The method of claim 1, wherein the cooking step includes cooking without the use of transglutaminase or other binding additives.

5. The method of claim 1, wherein the cooking step includes cooking with the use of transglutaminase or other binding additives.

6. The method of claim 1, wherein the raised surfaces are intercostal muscle.

7. The method of claim 1, wherein the depressions define an area where a rib bone was located.

8. The method of claim 1, wherein the raised surfaces are intercostal muscle and the depressions define an area where a rib bone was located.

9. The method of claim 1, wherein the interior side is a bone-side surface and the lateral side is an exterior meat-side surface.

10. The method of claim 1, wherein the boneless rib-meat product is pork.

11. The method of claim 1, wherein the boneless rib-meat product is beef.

12. The product produced by the method of claim 1.

* * * * *